United States Patent [19]

Claxton John C.

[11] Patent Number: 4,712,869
[45] Date of Patent: Dec. 15, 1987

[54] THREE DIMENSIONAL STACKED REPRODUCTION SCREEN

[76] Inventor: Claxton John C., 10844 High Ridge Rd., Jacksonville, Fla. 32225

[21] Appl. No.: 922,888

[22] Filed: Oct. 24, 1986

[51] Int. Cl.$^4$ ............................................. G03B 21/60
[52] U.S. Cl. ................................................. 350/126
[58] Field of Search ............................. 350/117–129; 352/43, 61, 86; 353/10, 79

[56] References Cited

U.S. PATENT DOCUMENTS

| | | | |
|---|---|---|---|
| 1,995,964 | 3/1935 | Darimont | 350/128 |
| 2,143,303 | 1/1939 | Darimont | 350/127 |
| 2,860,556 | 7/1937 | Jacobson | 350/9128 |
| 3,279,314 | 10/1966 | Miller | 350/126 |
| 4,566,756 | 1/1986 | Heijnemans | 350/126 |

*Primary Examiner*—Richard A. Wintercorn

[57] ABSTRACT

A three dimensional reproduction screen device whereby use of multiple transparent screens allows viewer to have actual depth perception. This is accomplished by having transparent screen area become opaque to through the screen viewing (or not transparent) when lit. Light is brought to the device by fiber optic fibers or other light sources. Device allows visual images to be created by light at different depths by use of multiple screen stacking.

2 Claims, 2 Drawing Figures

THREE DIMENSIONAL STACKED REPRODUCTION SCREEN

This device relates to reproduction screens for viewers such as television, cathode ray displays or other such screens. The current or prior art devices are two dimensional only, in that they transmit visually the single phosphor screen image.

The object of this device is to create the perception of depth into the television, cathode ray tube, or other screen utilizing light for the creating of images. This perception of depth is what is commonly referred to as "3-D".

BRIEF SUMMARY

The three dimensional stacked reproduction screen is a device to give three dimensional perspective to viewers. It is composed of multiple transparent screens whose lit areas become opaque to "through the screen viewing." This allows the reproduction of images of light at different depths to be viewed. The use of optic fibers or other light sources allows light to be brought to the screen and spread without losing the transparent quality of the rest of the screen area.

DRAWINGS

FIG. 1 (Sheet No. 1 of 2) shows a cutaway cross section of a typical screen, in this case the close up screen, with some partial optic fibers (4) shown.

FIG. 2 (Sheet No. 2 of 2) shows a top cutaway of final masking screen (8); close up screen (9); mid-range screen (10); and background screen (11). Also shown is air gap or vacuum gap between screens (7). Interior detail of mid-range and background screen are omitted as are optic fibers leading to them. Interior details of mid-range (10) and background screen (11) are omitted to show light routes for close up screen passing through, but elements are functionally the same as the close up screen (9).

DETAILED DESCRIPTION: THREE DIMENSIONAL STACKED REPRODUCTION SCREEN

Figure 1:
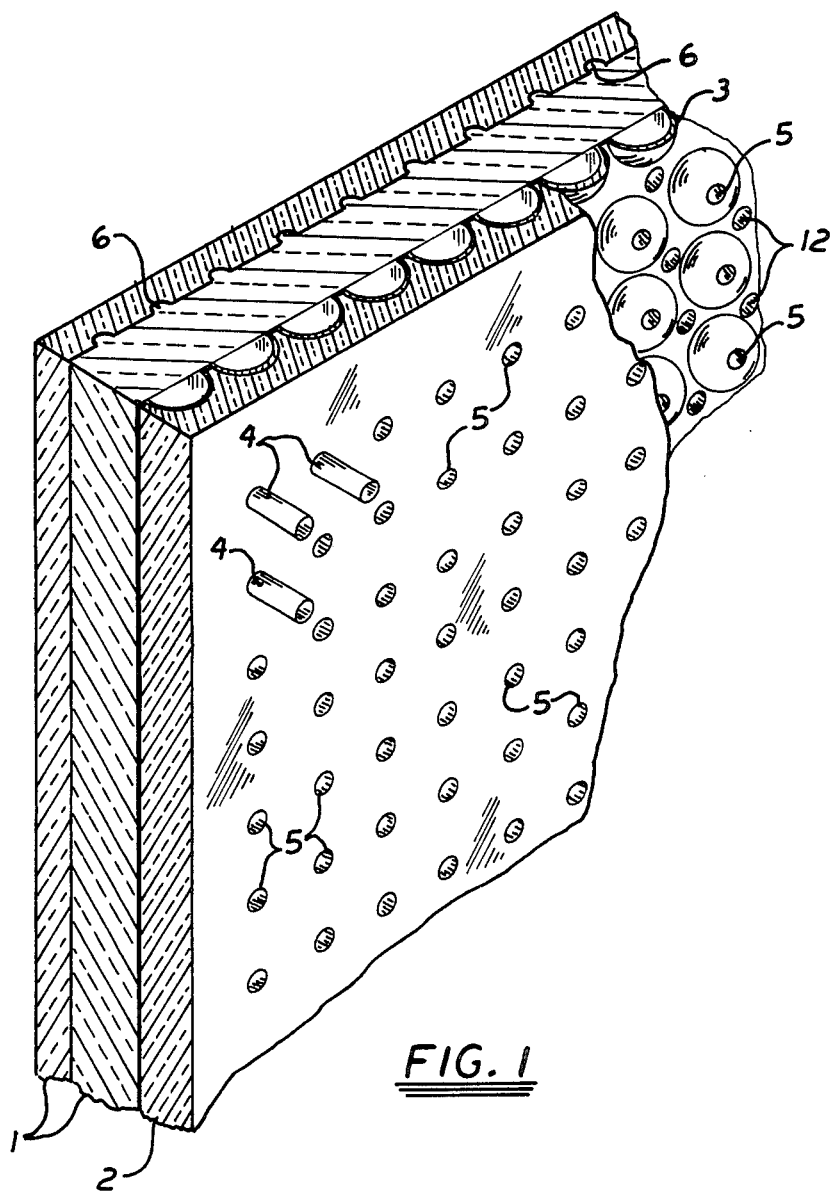

This stacked multiple transparent device is a means to display three dimensional images from television or cathode ray tubes or other light sources. It is comprised of stacked multiple compound screens composed of:

a. A glass transparent material layer (1) with concave (or otherwise optically engineered) mirror dots (6) imbedded. Mirror dots are somewhat larger than the diameter of each fiber optic fiber or light source beam and are displaced directly over each of them.

b. A dimpled mirror layer (3) which allows light to pass freely from the rear (convex side of dimple) but not from the front (concave side) where it reflects light. Said dimpled mirror layer blankets the entire screen. The light reflected from the dimple (3) converges around the mirror dot (6) which is smaller in diameter than the dimple. That is to say that the focal point of light reflected from each dimple is at a point beyond the dot and nearer the viewer.

c. Fiber optic fibers (4) or other light source bringing light through holes (5) in the screen layers through the center of each dimple to be lit. Light source or fiber optic fibers for other screens pass through holes between dimples (12).

d. An optional series of air or vacuum gaps (7) between screens so that as light reflected from dimple (3) enters next screen it is bent toward the normal (refracted). This refracting will tend to hide or mask dot (6) by the apparent spreading of the light source.

e. An optional final masking pane or screen (8) between the viewer and the rest of the screen assembly.

f. Back layer (2) and layers of compound screen (1) in front of dimpled mirrored layer (3) "sandwiching" it so that distortion due to refraction is minimized.

Device is a 3-D reproduction system having multiple (2 or more) transparent screens. Each screen is, in part, a series of contiguous reflecting concave dimples (3). The dimples are fed light (white or colored) by optic fibers or other light source coming from the rear. Optic fiber takes its light from phosphor screen or other light source independent of multiple stacked screen. Light from light source or optic fiber is reflected to dimple surface by concave (or otherwise optically engineered) mirror dot (6). Dimpled mirrored sheet allows light to pass from the rear so that further panes, if lit, are seen through each preceding pane. Since the image is of a view from afar, the small distances between screens will appear, relative to the viewer, to be normal three dimensional vision. Screen assembly is a stack of screens, each capable of reproducing an image, and where not lit of allowing through the screen view to the next or deeper screen or screens. Each screen in the stack is parallel and equidistant at all points to the next screen. Final masking screen (8) is a plain transparent screen with no interior elements—its only function is refraction.

Figure 2:
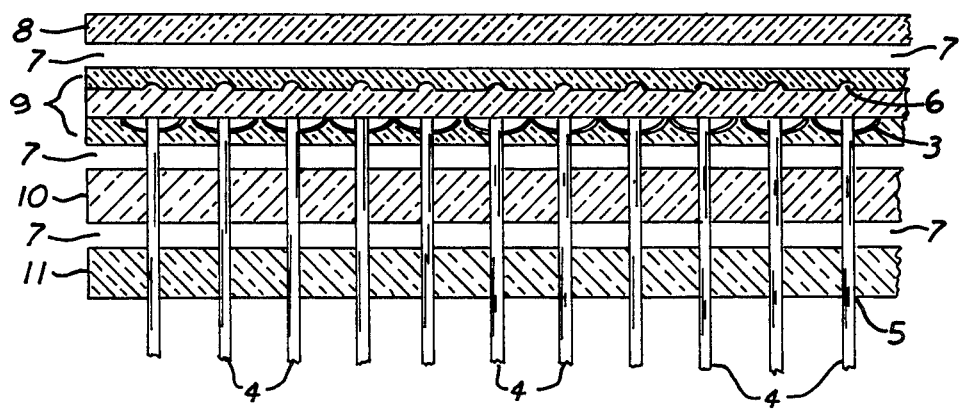

The fiber optics fibers or other light source routes are numerous, but of course, decrease as each succeeding screen is passed as you move toward viewer. Close up screen (9) has fewest fibers or routes. Not shown in the views but used in the device is a circumferential band which acts to hold screens in place and as a dust and light guard. Said band is grooved and fitted to accept screen edges and hold them in place. Said band goes completely around circumference of screen stack. No claim is made for the band since it is in common use. Threaded bolts or other fasteners or glues may also be used near corners of screen stack or otherwise to further strengthen device and bind each screen into place. If air or vacuum gaps are not used (no masking) screens may simply be bonded together. Mid-range screen (10) and background screen (11) are shown in FIG. 2 without interior detail which is functionally the same as close up screen (9) which is shown.

Other configurations for the device are possible and the one given should not be construed as a limitation on the scope of the invention. The scope of the invention should be determined by the appended claims and their legal equivalents.

I claim:

1. Stacked multiple transparent screen device as a means for displaying light from each separate optic fiber or other light source over a specific area of a specific screen and viewing said light through intervening subsequent screens when intervening areas of subsequent screens are unlit, said stacked multiple transparent screen device comprising:

a. stacked multiple transparent screens as a means whereby lit areas become opaque to "through the screen" viewing while lit, b. mirrored layer sandwiched between screen layers as a means to reflect light from light source or fiber optic fiber back to viewer while unlit area of mirrored surface passes light freely from rear allowing through the screen viewing,
c. reflecting devices imbedded in screens as a means to reflect light from fiber optic fiber or other light source back on mirrored surface,
d. between the screens air gaps or vacuum gaps whereby with next transparent layer or screen that light enters it effects a masking screen to mask or hide the dot or unlit area of mirror by refraction of the converging light from outer edges of lighted area or mirrored surface.

2. Stacked multiple transparent screen device as claimed in claim 1, characterized in that screen uses all elements but omits air gap or vacuum gap if masking is not desired as a means to perform same basic job, multiple screens are simply made adjacent or touching, in effect, a packed stack.

* * * * *